United States Patent
Nishikino et al.

(10) Patent No.: US 12,368,275 B2
(45) Date of Patent: Jul. 22, 2025

(54) PULSE SHAPING DEVICE AND PULSE SHAPING METHOD

(71) Applicant: NATIONAL INSTITUTES FOR QUANTUM SCIENCE AND TECHNOLOGY, Chiba (JP)

(72) Inventors: Masaharu Nishikino, Chiba (JP); Michiaki Mori, Chiba (JP); Thanhhung Dinh, Chiba (JP); Sadaoki Kojima, Chiba (JP); Toshiyuki Kitamura, Chiba (JP); Noboru Hasegawa, Chiba (JP); Kiminori Kondo, Chiba (JP)

(73) Assignee: NATIONAL INSTITUTES FOR QUANTUM SCIENCE AND TECHNOLOGY, Chiba (JP)

( * ) Notice: Subject to any disclaimer, the term of this patent is extended or adjusted under 35 U.S.C. 154(b) by 595 days.

(21) Appl. No.: 17/786,921

(22) PCT Filed: Nov. 27, 2020

(86) PCT No.: PCT/JP2020/044173
§ 371 (c)(1),
(2) Date: Jun. 17, 2022

(87) PCT Pub. No.: WO2021/131487
PCT Pub. Date: Jul. 1, 2021

(65) Prior Publication Data
US 2023/0029156 A1    Jan. 26, 2023

(30) Foreign Application Priority Data

Dec. 27, 2019 (JP) .................. 2019-239404

(51) Int. Cl.
*H01S 3/10* (2006.01)
*H01S 3/00* (2006.01)
(Continued)

(52) U.S. Cl.
CPC .......... *H01S 3/0057* (2013.01); *H01S 3/0092* (2013.01); *H01S 3/10023* (2013.01);
(Continued)

(58) Field of Classification Search
CPC .. H01S 3/0057; H01S 3/0092; H01S 3/10023; H01S 3/10061; H01S 3/1636; H01S 3/005; H01S 2301/02
See application file for complete search history.

(56) References Cited

U.S. PATENT DOCUMENTS

| 5,838,709 A | 11/1998 | Owa | |
|---|---|---|---|
| 2006/0170858 A1* | 8/2006 | Albert | ............... G02F 1/3551 349/169 |

(Continued)

FOREIGN PATENT DOCUMENTS

| CN | 103259180 A | 8/2013 |
|---|---|---|
| JP | 09246648 A | 9/1997 |

(Continued)

OTHER PUBLICATIONS

ISA/JP, International Search Report for corresponding PCT Patent Application No. PCT/JP2020/044174, mailed Feb. 16, 2021, 6 pages.

(Continued)

*Primary Examiner* — Kinam Park
(74) *Attorney, Agent, or Firm* — NK Patent Law (57) ABSTRACT

This invention provides a pulse shaping technique that can yield a pulsed laser having a smaller energy fluctuation than that of a conventional pulse shaping technique using one or two non-linear optical crystals. A pulse shaping device includes: a non-linear optical crystal group including at least three non-linear optical crystals arranged side by side on an optical path of an input pulsed laser.

10 Claims, 6 Drawing Sheets

(51) Int. Cl.
*H01S 3/16* (2006.01)
*G02F 1/355* (2006.01)

(52) U.S. Cl.
CPC ........ *H01S 3/10061* (2013.01); *H01S 3/1636* (2013.01); *G02F 1/3551* (2013.01); *H01S 3/005* (2013.01); *H01S 2301/02* (2013.01)

(56) References Cited

U.S. PATENT DOCUMENTS

| | | | |
|---|---|---|---|
| 2007/0263680 A1* | 11/2007 | Starodoumov | H01S 3/2308 372/21 |
| 2008/0304523 A1 | 12/2008 | Kiriyama et al. | |
| 2011/0134944 A1* | 6/2011 | Kaneda | G02F 1/3532 372/22 |
| 2015/0010027 A1* | 1/2015 | Simon-Boisson | H01S 3/10023 372/21 |
| 2017/0141530 A1* | 5/2017 | Courjaud | B23K 26/0624 |
| 2017/0219911 A1* | 8/2017 | Kawase | G02F 1/3501 |
| 2018/0083407 A1 | 3/2018 | Song et al. | |
| 2022/0155650 A1* | 5/2022 | Qu | G02F 1/37 |

FOREIGN PATENT DOCUMENTS

| | | |
|---|---|---|
| JP | 2008299155 A | 12/2008 |
| JP | 2009053505 A | 3/2009 |
| JP | 2014138047 A | 7/2014 |
| JP | 2015506489 A | 3/2015 |

OTHER PUBLICATIONS

ISA/JP, Written Opinion for corresponding PCT Patent Application No. PCT/JP2020/044174, mailed Feb. 16, 2021, 8 pages.

Xie, N. et al.: "Improvement of temporal contrast for ultrashort laser pulses by cross-polarized wave generation", OPTIK, 2012, vol. 123, pp. 565-568, pp. 566-567.

Canova, L. et al.: "Efficient generation of cross-polarized femtosecond pulses in cubic crystals with holographic cut orientation", Applied Physics Letters 92, 231102 (2008), 3 pages.

Jullien, A. et al.: "High-fidelity front-end for high-power, high temporal quality few-cycle lasers", Appl Phys B (2011) 102: 769-774.

Jullien, A. et al.: "Two crystal arrangement to fight efficiency saturation in cross-polarized wave generation", Optics Express, Apr. 3, 2006, vol. 14, No. 7, pp. 2760-2769, pp. 2761-2763.

Jullien A et al.: "Highly efficient temporal cleaner for femtosecond pulses based on cross-polarized wave generation in a dual crystal scheme", Applied Physics B ; Lasers and Optics, vol. 84, No. 3, Jun. 29, 2006, pp. 409-414, XP019424623.

EPO, Extended European Search Report for corresponding European Patent Application No. 20907172.9 dated Jan. 2, 2024, 9 pages.

* cited by examiner

PULSE SHAPING DEVICE AND PULSE SHAPING METHOD

CROSS-REFERENCE TO RELATED APPLICATIONS

This application is a U.S. National Stage Application of International Patent Application No. PCT/JP2020/044173, filed on Nov. 27, 2020, which claims priority to Japanese Patent Application No. 2019-239404, filed on Dec. 27, 2019, the entire contents of all of which are incorporated by reference herein.

TECHNICAL FIELD

The present invention relates to a pulse shaping device, which is a device that improves a contrast ratio of a pulsed laser. The present invention also relates to a pulse shaping method that is a method for improving a contrast ratio of a pulsed laser.

BACKGROUND ART

Thanks to development of a chirped pulse amplification method, it has become easier to generate a high-intensity, ultrashort pulsed laser. With the chirped pulse amplification method, laser light is amplified at a pulse width of around some nanoseconds, and is then temporally compressed by a pulse compressor. A pulsed laser obtained by the chirped pulse amplification method exceeds TW (a trillion W, i.e., $10^{12}$ W), and therefore is expected to be applied to ion acceleration such as Target Normal Sheath Acceleration (TNSA).

However, a pulsed laser obtained by the chirped pulse amplification method includes a low-intensity component (s), such as a background light component called spontaneous emission and/or a prepulse component generated in an amplification process, that reaches a target substance earlier than a main pulse by some nanoseconds. These low-intensity components may, for example, alter the target substance before the main pulse reaches the target substance, thereby inhibiting an interaction between the main pulse and the target substance. Thus, the low-intensity components are practically disadvantageous. For example, in a case where the target substance is a metal, plasma is formed by the prepulse before the main pulse reaches the target substance. In order to prevent formation of the plasma, the intensity of the prepulse should be reduced to be not more than an ionization threshold intensity (approximately 10 billion W/cm$^2$, i.e., $10^{10}$ W/cm$^2$).

A ratio between an intensity of the main pulse and an intensity of the prepulse in the pulsed laser is called a contrast ratio. Known examples of a technique for improving the contrast ratio of the pulsed laser encompass a plasma mirror method, a saturable absorber method, an optical parametric chirped pulse amplification method, and an orthogonally polarized light generating method.

When a pulsed laser is emitted to a target substance, high-density plasma is generated at a part in which a damage threshold is exceeded. The plasma mirror method takes advantage of the high-density plasma to improve a contrast ratio of the pulsed laser. However, the plasma mirror method takes out a main pulse as reflected light from the high-density plasma, and therefore the main pulse has low reflectance and low stability, disadvantageously. The plasma mirror method is also problematic in that high-density plasma, which functions as a plasma mirror, cannot be repeatedly generated at the same part of the mirror.

A saturable absorber absorbs a low-intensity prepulse and allows a high-intensity main pulse to transmit therethrough. The saturable absorber method uses the saturable absorber to improve a contrast ratio of a pulsed laser. However, the saturable absorber method is problematic in that the saturable absorber is easily damaged due to heat generated due to laser light absorption. In addition, although the saturable absorber method can adequately reduce an intensity of a low-intensity component (prepulse) entering the saturable absorber before a main pulse reaches the saturable absorber, the saturable absorber method cannot adequately reduce an intensity of a low-intensity component entering the saturable absorber after the main pulse reaches the saturable absorber. Also in this point, the saturable absorber method is problematic. This happens for the following reason. That is, once the saturable absorber is brought into a supersaturation state, the saturable absorber continuously allows pulses to transmit therethrough even if the pulses have a lower intensity.

With the optical parametric chirped pulse amplification method, in principle, amplification of a subject pulse is carried out only when an excitation pulse having an intensity that can cause an optical parametric phenomenon exists. In view of this, the optical parametric chirped pulse amplification method is a technique effective for enhancing a contrast of a pulsed laser. Actually, it has been demonstrated that use of the optical parametric chirped pulse amplification method can yield a pulsed laser having a contrast ratio having a 12-digit value at maximum. However, it is known that an output energy obtained by the optical parametric chirped pulse amplification is unstable due to a temporal jitter between an excitation pulse and a pulse to be amplified.

When linearly polarized light is input to a non-linear optical crystal, the linearly polarized light is partially converted into orthogonally polarized light (i.e., into linearly polarized light having a polarization direction orthogonal to the original linearly polarized light). An efficiency in this conversion is proportional to the cube of an intensity of the linearly polarized light entering the non-linear optical crystal. Thus, when a pulsed laser is input to a non-linear optical crystal, a main pulse, which has a relatively high intensity, is converted into orthogonally polarized light at a higher conversion efficiency than that of a prepulse, which has a relatively low intensity. Therefore, a contrast ratio of a pulsed laser output from the non-linear optical crystal is higher than a contrast ratio of the pulsed laser input to the non-linear optical crystal. The orthogonally polarized light generating method takes advantage of this property of the high-density non-linear optical crystal to improve a contrast ratio of a pulsed laser. Recently, it has been reported that use of the orthogonally polarized light generating method can yield a pulsed laser having a contrast ratio having a 10- to 11-digit value.

According to the orthogonally polarized light generating method, a conversion efficiency at which linearly polarized light is converted into orthogonally polarized light is proportional to the cube of an incident intensity. Thus, the orthogonally polarized light generating method is often carried out with an incident intensity set to be close to a damage threshold of the non-linear optical crystal. This may lead to a problem that the non-linear optical crystal emits white light due to self-phase modulation and/or a problem that the non-linear optical crystal is damaged.

A technique for improving a contrast ratio of a pulsed laser is disclosed in, for example, Patent Literatures 1 to 3 and Non-Patent Literatures 1 to 3.

CITATION LIST

Patent Literature

[Patent Literature 1]
Japanese Patent Application Publication Tokukai No. 2008-299155
[Patent Literature 2]
Japanese Patent Application Publication Tokukai No. 2009-053505
[Patent Literature 3]
Japanese Patent Application Publication Tokukai No. 2014-138047

Non-Patent Literature

[Non-Patent Literature 1]
Efficient generation of cross-polarized femtosecond pulses in cubic crystals with holographic cut orientation, Appl. Phys. Lett. 92, 231102 (2008).
[Non-Patent Literature 2]
High-fidelity front-end for high-power, high temporal quality few-cycle lasers, Appl. Phys. B 102: 769-774 (2011).
[Non-Patent Literature 3]
Two crystal arrangement to fight efficiency saturation in cross-polarized wave Generation, Opt. Exp. 14, 2760 (2011).

SUMMARY OF INVENTION

Technical Problem

As described above, the orthogonally polarized light generating method is a quite effective pulse shaping technique that can remarkably improve a contrast ratio of a pulsed laser. Particularly, a pulse shaping technique involving use of two non-linear optical crystals, such as the one disclosed in Non-Patent Literature 3, can provide a conversion efficiency of approximately 20%. Thus, such a pulse shaping technique is expected to be applied to various fields that require a laser with a high contrast ratio and a high intensity, such as the field of ion acceleration.

However, the pulse shaping technique involving use of one or two non-linear optical crystals is problematic in that a pulsed laser obtained by this technique has a great energy fluctuation. Here, an energy fluctuation in a pulsed laser refers to a variation in energies measured for respective pulses with regard to the pulsed laser.

For example, in the ion acceleration, emission of a pulsed laser having a great energy fluctuation to a target may bring unstability in energies, the number of particles, and/or the like of the accelerated ions. Thus, for stable ion acceleration, it is important to suppress the energy fluctuation in the pulsed laser.

An aspect of the present invention was made in view of the above problems, and has an object to provide a pulse shaping technique that can yield a pulsed laser having a smaller energy fluctuation than that yielded by a conventional pulse shaping technique involving use of one or two non-linear optical crystals.

Solution to Problem

A pulse shaping device in accordance with an aspect of the present invention includes: a non-linear optical crystal group including at least three non-linear optical crystals arranged side by side on an optical path of an input pulsed laser.

A pulse shaping method in accordance with an aspect of the present invention includes: using a non-linear optical crystal group to improve a contrast ratio of an input pulsed laser, the non-linear optical crystal group including at least three non-linear optical crystals arranged side by side on an optical path of the input pulsed laser.

Advantageous Effects of Invention

In accordance with an aspect of the present invention, it is possible to provide a pulse shaping technique that can yield a pulsed laser having a smaller energy fluctuation than that yielded by a conventional pulse shaping technique involving use of one or two non-linear optical crystals.

DESCRIPTION OF EMBODIMENTS (Configuration of Pulse Shaping Device)

Figure 1:
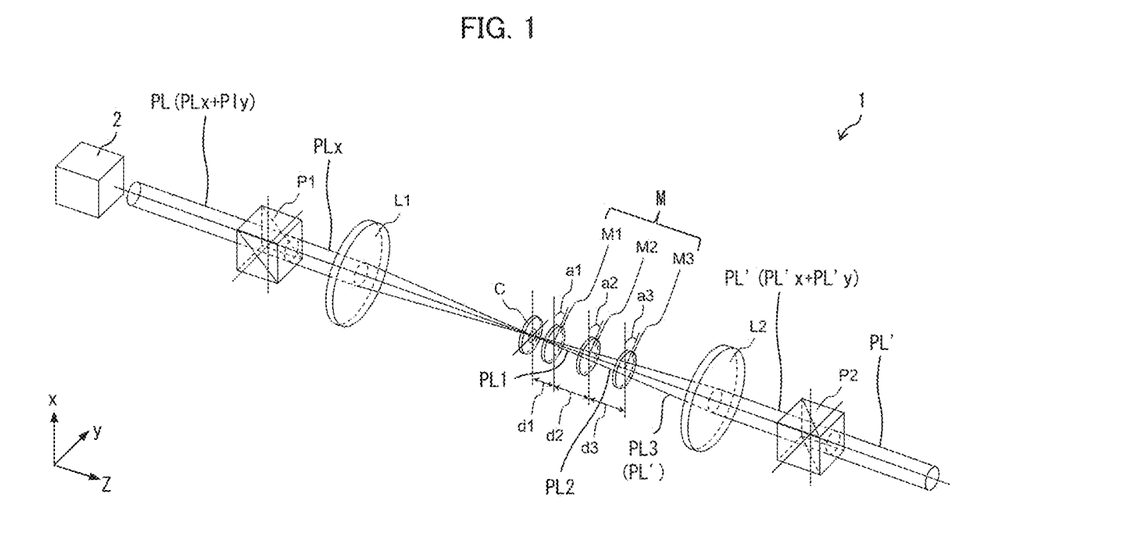
FIG. 1 is a perspective view illustrating a configuration of a pulse shaping device in accordance with an embodiment of the present invention.

The following description will discuss, with reference to FIG. 1, a configuration of a pulse shaping device 1 in accordance with an embodiment of the present invention. FIG. 1 is a perspective view illustrating a configuration of the pulse shaping device 1.

As shown in FIG. 1, the pulse shaping device 1 includes a first polarizer P1, a first lens L1, a pinhole C, a non-linear optical crystal group M, a second lens L2, and a second polarizer P2. The pulse shaping device 1 is a device that improves a contrast ratio of a pulsed laser PL output from a laser light source 2. The present embodiment employs, as the laser light source 2, a titanium-sapphire laser capable of outputting an ultrashort pulsed laser.

The following provides an explanation using an orthogonal coordinate system that has a z-axis being in parallel with a traveling direction of a pulsed laser PL output from the laser light source 2, an x-axis orthogonal to the z-axis, and a y-axis orthogonal to both the z-axis and the x-axis. In the explanation below, linearly polarized light having a polarization direction (a direction in which an electric field oscillates) being in parallel with the x-axis and having a traveling direction being in parallel with the z-axis is described as x-polarized light, and linearly polarized light having a polarization direction being in parallel with the y-axis and having a traveling direction being in parallel with the z-axis is described as y-polarized light. Assume herein that the pulsed laser PL output from the laser light source 2 includes a pulsed laser PLx, which is x-polarized light, and a pulsed laser PLy, which is y-polarized light.

The pulsed laser PL output from the laser light source 2 is input to the first polarizer P1. The first polarizer P1 selectively allows, of the pulsed laser PL having been input, an x-polarized light component to transmit therethrough. Thus, the pulsed laser having transmitted through the first polarizer P1 is a pulsed laser PLx, which is x-polarized light. The present embodiment employs, as the first polarizer P1, a cubic Glan-Taylor prism, which has a high extinction ratio. In a case where the pulsed laser PL output from the laser light source 2 is x-polarized light, the first polarizer P1 can be omitted.

The pulsed laser PLx having transmitted through the first polarizer P1 is input to the first lens L1. The first lens L1 converges the pulsed laser PLx thus input. In other words, the first lens L1 converts the input pulsed laser PLx so that a parallel light flux or a divergent light flux is turned into a converged light flux. That is, the pulsed laser PLx having transmitted through the first lens L1 is a converged light flux. The present embodiment employs, as the first lens L1, a plano-convex lens having a focal length of, e.g., 1000 mm. In a case where the pulsed laser PLx that is to transmit through the first polarizer P1 is a converged light flux, the first lens L1 can be omitted.

The pulsed laser PLx having transmitted through the first lens L1 is input to the pinhole C. The pinhole C selectively allows, of the pulsed laser PLx having been input, a paraxial component to transmit therethrough. That is, the pinhole C serves as a spatial filter. The pinhole C is positioned at a converging point of the pulsed laser PLx having transmitted through the first lens L1. Thus, the pulsed laser PLx having transmitted through the pinhole C is turned into a divergent light flux. The present embodiment employs a mechanical iris as the pinhole C. In a case where the pulsed laser PLx that is to transmit through the first lens L1 has an adequately small wavefront distortion, the pinhole C can be omitted.

The pulsed laser PLx having transmitted through the pinhole C is input to the non-linear optical crystal group M. The non-linear optical crystal group M converts a part of the pulsed laser PLx having transmitted through the pinhole C into y-polarized light. Thus, a pulsed laser PL' output from the non-linear optical crystal M includes a pulsed laser PL'x, which is x-polarized light, and a pulsed laser PL'y, which is y-polarized light. Here, a conversion efficiency in the non-linear optical crystal group M at which the pulsed laser PLx is converted into the pulsed laser PL'y is proportional to the cube of an intensity of the pulsed laser PLx. Therefore, a center part (main pulse) of the pulsed laser PLx having a relatively high intensity is converted into y-polarized light at a higher conversion efficiency than that of a peripheral part (prepulse) of the pulsed laser PLx having a relatively low intensity. Accordingly, the pulsed laser PL'y, which is y-polarized light output from the non-linear optical crystal group M, has a higher contrast ratio than a contrast ratio of the pulsed laser PL output from the laser light source 2. Note that a configuration of the non-linear optical crystal group M will be described later.

The pulsed laser PL' output from the non-linear optical crystal group M is input to the second lens L2. The second lens L2 collimates the pulsed laser PL' thus input. In other words, the second lens L2 converts the input pulsed laser PL' so that a divergent light flux is turned into a parallel light flux. That is, the pulsed laser PL' having transmitted through the second lens L2 is a parallel light flux. The present embodiment employs, as the second lens L2, a plano-convex lens having a focal length of 1000 mm. In the present embodiment, the pulsed laser PL is preliminarily adjusted so that the pulsed laser PL' having transmitted through the second lens L2 can have a shortest pulse.

The pulsed laser PL' having transmitted through the second lens L2 is input into the second polarizer P2. The second polarizer P2 selectively allows, of the pulsed laser PL' having been input, a y-polarized light component to transmit therethrough. Consequently, a pulsed laser output from the second polarizer P is a pulsed laser PL'y, which is y-polarized light. The present embodiment employs, as the first polarizer P1, a cubic Glan-Taylor prism, which has a high extinction ratio.

As described above, when a pulsed laser PL output from the laser light source 2 is input to the pulse shaping device 1, a pulsed laser PL'y having a higher contrast ratio than that of the pulsed laser PL is output from the pulse shaping device 1. That is, the pulse shaping device 1 can improve the contrast ratio of the pulsed laser PL output from the laser light source 2.

(Configuration of Non-Linear Optical Crystal Group)

The following description will discuss, with reference to FIG. 1, a configuration of the non-linear optical crystal group M.

The non-linear optical crystal group M may include n non-linear optical crystals M1 to Mn arranged side by side on an optical path of a pulsed laser PL. Here, n is an arbitrary natural number of 3 or more. In the present embodiment, the number (n) of non-linear optical crystals M1 to Mn constituting the non-linear optical crystal group M is 3. The present embodiment employs, as each of the non-linear optical crystals M1 to M3, a $BaF_2$ crystal processed into a disk shape having a thickness of 1.0 mm and having a crystallographic axis orthogonal to a thickness direction of the crystal. The non-linear optical crystals M1 to M3 are arranged so that their principal surfaces are in parallel with an xy-plane and allow an optical axis of a pulsed laser PL to pass through their centers. Consequently, the crystallographic axes of the non-linear optical crystals M1 to M3 are in parallel with the xy-plane.

The first non-linear optical crystal M1 converts a part of the pulsed laser PLx, which is x-polarized light, into y-polarized light. Consequently, a pulsed laser PL1 output from the first non-linear optical crystal M1 includes a pulsed laser PL1x, which is x-polarized light, and a pulsed laser PL1y, which is y-polarized light. Similarly, the second non-linear optical crystal M2 converts a part of the pulsed laser PL1x, which is x-polarized light, into y-polarized light. Consequently, a pulsed laser PL2 output from the second non-linear optical crystal M2 includes a pulsed laser PL2x, which is x-polarized light, and a pulsed laser PL2y, which is y-polarized light. Similarly, the third non-linear optical crystal M3 converts a part of the pulsed laser PL2x, which is x-polarized light, into y-polarized light. Consequently, a pulsed laser PL3 output from the third non-linear optical crystal M3 includes a pulsed laser PL3x, which is x-polarized light, and a pulsed laser PL3y, which is y-polarized light. As described above, in the present embodiment, the non-linear optical crystal group M includes the three non-linear optical crystals M1 to M3. Thus, in the present embodiment, the pulsed laser PL3 output from the third non-linear optical crystal M3 corresponds to the pulsed laser PL', which is output from the non-linear optical crystal group M.

A distance d1 from the pinhole C to the first non-linear optical crystal M1, a distance d2 from the first non-linear optical crystal M1 to the second non-linear optical crystal M2, and a distance d3 from the second non-linear optical crystal M2 to the third non-linear optical crystal M3 can be set independently. A rotation angle a1 of the first non-linear optical crystal M1, a rotation angle a2 of the second non-linear optical crystal M2, and a rotation angle a3 of the third non-linear optical crystal M3 can be set independently. Here, a rotation angle ai of each non-linear optical crystal Mi refers to an angle made by a crystallographic axis of the non-linear optical crystal Mi and the x-axis (i.e., an axis being in parallel with a polarization direction of the pulsed laser PLx) (i=1, 2, 3).

The distance d1 is set so that an energy conversion efficiency η1 at which the pulsed laser PLx is converted into the pulsed laser PL1y is maximized within a range that does not cause the first non-linear optical crystal M1 to generate white light due to self-phase modulation and that does not cause a damage in the first non-linear optical crystal M1. The rotation angle a1 is set so that the energy conversion efficiency η1 is maximized with the distance d1 being set as described above. Note that the state in which white light due to self-phase modulation is not generated can be confirmed by, e.g., (i) checking for light generation by a CCD camera, visual observation, and/or the like or (ii) observation of a spectrum through spectroscopic measurement. The state in which no damage occurs can be confirmed by, e.g., (i) observation by a CCD camera, visual observation, and/or the like or (ii) detection of a reduction in output.

Here, the energy conversion efficiency η1 is defined as follows: η1=(energy of pulsed laser PL1y/energy of pulsed laser PLx). In a case where the first non-linear optical crystal M1 has a crystal orientation of [100], the energy conversion efficiency η1 is substantially proportional to sin(4×a1). Thus, in this case, the energy conversion efficiency η1 has a maximum value when the rotation angle a1 is set at approximately 22.5°, approximately 67.5°, approximately 112.5°, or approximately 157.5°.

With the distance d1 and the rotation angle a1 being set as described above, the distance d2 is set so that an energy conversion efficiency η2 at which the pulsed laser PLx is converted into the pulsed laser PL2y is maximized within a range that does not cause the second non-linear optical crystal M2 to generate white light due to self-phase modulation and that does not cause a damage in the second non-linear optical crystal M2. With the distance d2 being set as described above, the rotation angle a2 is set so that an energy fluctuation σ2 in the pulsed laser PL2y is smaller than an energy fluctuation σ1 in the pulsed laser PL1y. More preferably, the distance d2 is set so that the energy fluctuation σ2 is minimized.

Here, the energy conversion efficiency η2 is defined as follows: η2=(energy of pulsed laser PL2y/energy of pulsed laser PLx). The energy fluctuation σ2 is defined by a standard deviation of energies measured for respective pulses with regard to the pulsed laser PL2y. In a case where each of the non-linear optical crystals M1 and M2 has a crystal orientation of [100], the energy conversion efficiency η2 is substantially proportional to sin(2×a2). In this case, the energy fluctuation σ2 is substantially proportional to) sin (2×a2−22.5°. Therefore, in this case, the energy fluctuation σ2 has a maximum value when the rotation angle a2 is set at approximately 67.5° or approximately 157.5°.

With the distances d1 and d2 and the rotation angles a1 and a2 being set as described above, the distance d3 is set so that an energy conversion efficiency η3 at which the pulsed laser PLx is converted into the pulsed laser PL3y is maximized within a range that does not cause the third non-linear optical crystal M3 to generate white light due to self-phase modulation and that does not cause a damage in the third non-linear optical crystal M3. With the distance d3 being set as described above, the rotation angle a3 is set so that an energy fluctuation σ3 in the pulsed laser PL3y is smaller than an energy fluctuation σ2 in the pulsed laser PL2y. More preferably, the rotation angle a3 is set so that the energy fluctuation σ3 in the pulsed laser PL3y is minimized.

Here, the energy conversion efficiency η3 is defined as follows: η3=(energy of pulsed laser PL3y)/(energy of pulsed laser PLx). The energy fluctuation σ3 is defined by a standard deviation of energies measured for respective pulses with regard to the pulsed laser PL3y. In a case where each of the non-linear optical crystals M1 to M3 has a crystal orientation of [100], the energy conversion efficiency η3 is substantially proportional to sin(2×a3). In this case, the energy fluctuation σ3 is substantially proportional to)sin(2× a3−22.5°. Therefore, in this case, the energy fluctuation σ3 has a maximum value when the rotation angle a3 is set at approximately 67.5° or approximately 157.5°.

Note that the energy conversion efficiency η2 can be made equal to or greater than the energy conversion efficiency η1 (i.e., can be made substantially 4 times the energy conversion efficiency η1 at maximum). The reason for this is as follows. That is, the pulsed laser PL1x that is to be input to the second non-linear optical crystal M2 has been converged in the first non-linear optical crystal M1 due to Kerr lens effect. In addition, a phase shift amount accumulated in the second non-linear optical crystal M2 is increased thereby, and consequently a condition that the pulsed laser PL1y and the y-polarized light generated by the second non-linear optical crystal M2 interfere with each other so as to strengthen each other is satisfied. For a similar reason, the energy conversion efficiency η3 can be made equal to or greater than the energy conversion efficiency η2.

By setting the distances d1 to d3 and the rotation angles a1 to a3 as described above, an energy fluctuation in the pulsed laser PL'y output from the pulse shaping device 1 (in the present embodiment, corresponding to the pulsed laser PL3y output from the third non-linear optical crystal M3) can be reduced as compared with an energy fluctuation (that is approximately 5 times an energy fluctuation in a pulsed laser output from the laser light source) in a pulsed laser output from a conventional pulse shaping device.

Note that the pulse shaping device 1 preferably further includes holders that respectively hold the non-linear optical crystals Mi in such a manner that the non-linear optical crystals Mi are rotatable about an optical axis of the pulsed laser PL as a rotational axis. This enables easy adjustment of the rotation angle ai by rotating each non-linear optical crystal Mi. The pulse shaping device 1 preferably further includes holders that respectively hold non-linear optical crystals Mi in such a manner that the non-linear optical crystals Mi are movable along the optical axis of the pulsed laser PL and parallel to the optical axis. With this, each non-linear optical crystal Mi can be moved parallel to the optical axis, and thereby the distance di can be adjusted easily.

(Specific Example of Method for Setting Distances d1 to d3 and Rotation Angles a1 to a3)

Figure 2:
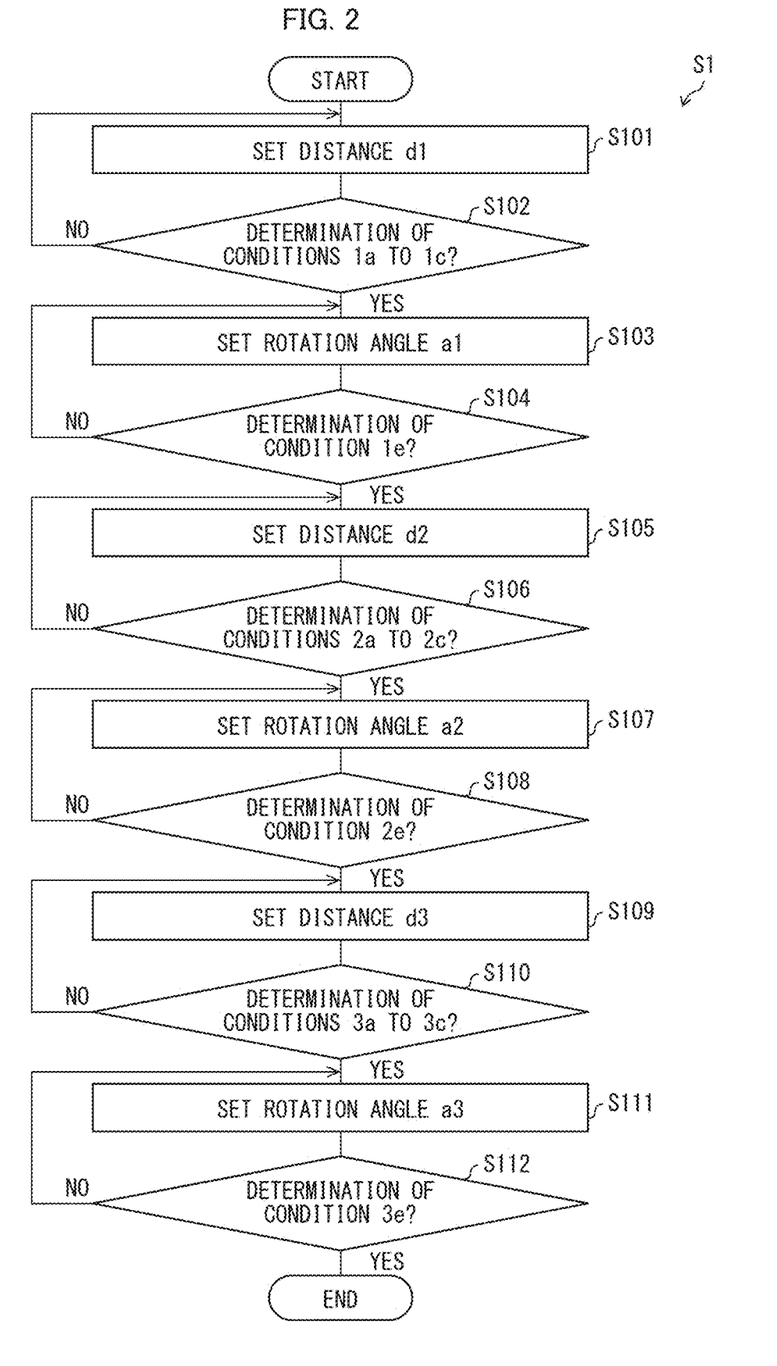
FIG. 2 is a flowchart illustrating a flow of a pulse shaping method in accordance with an embodiment of the present invention.

The following description will discuss, with reference to FIG. 2, a specific example of a method for setting the distances d1 to d3 and the rotation angles a1 to a3. FIG. 2 is a flowchart illustrating a flow of a setting method 51 in accordance with the specific example.

As shown in FIG. 2, the setting method 51 includes steps S101 to S104, which are related to the first non-linear optical crystal M1, steps S105 to S108, which are related to the second non-linear optical crystal M2, and steps S109 to S112, which are related to the third non-linear optical crystal M3.

Step S101 is a step of adjusting the distance d1 from the pinhole C to the first non-linear optical crystal M1. In one example, step S101 is a step of increasing the distance d1 by a predetermined increment $\Delta$, where an initial value d1=0. In this case, carrying out step S101 $m$ times repeatedly sets the distance d1 at $\Delta \times m$. Step S102 is a step of determining whether or not the following conditions 1a to 1c are satisfied. Step S101 is repeatedly carried out until it is determined in step S102 that all the conditions 1a to 1c are satisfied.

Condition 1a: The energy conversion efficiency $\eta 1$ in the first non-linear optical crystal M1 is maximized.
Condition 1b: The first non-linear optical crystal M1 does not generate white light due to self-phase modulation.
Condition 1c: The first non-linear optical crystal M1 is not damaged.

Note that, in a case where a power density of the pulsed laser PL input to the first non-linear optical crystal M1 is not more than 20 GW/cm$^2$, white light or a damage would not generally occur in the first non-linear optical crystal M1. Therefore, each of the conditions 1b and 1c may be replaced with the following condition 1d.

Condition 1d: The power density of the pulsed laser PL input to the first non-linear optical crystal M1 is not more than 20 GW/cm$^2$.

Step S103 is a step of adjusting the rotation angle a1 of the first non-linear optical crystal M1. In one example, step S103 is a step of increasing the rotation angle a1 by a predetermined increment $\delta$, where an initial value a1=0. In this case, carrying out step S103 $m$ times repeatedly sets the rotation angle a1 at $\delta \times m$. Step S104 is a step of determining whether or not the following condition 1e is satisfied. Step S103 is repeatedly carried out until it is determined in step S104 that the following condition 1e is satisfied.

Condition 1e: The energy conversion efficiency $\eta 1$ in the first non-linear optical crystal M1 is maximized.

Step S105 is a step of adjusting the distance d2 from the first non-linear optical crystal M1 to the second non-linear optical crystal M2. In one example, step S105 is a step of increasing the distance d2 by a predetermined increment $\Delta$, where an initial value d2=0. In this case, carrying out step S105 $m$ times repeatedly sets the distance d2 at $\Delta \times m$. Step S106 is a step of determining whether or not the following conditions 2a to 2c are satisfied. Step S105 is repeatedly carried out until it is determined in step S106 that all the conditions 2a to 2c are satisfied.

Condition 2a: The energy conversion efficiency $\eta 2$ in the first non-linear optical crystal M1 and the second non-linear optical crystal M2 is maximized.
Condition 2b: The second non-linear optical crystal M2 does not generate white light due to self-phase modulation.
Condition 2c: The second non-linear optical crystal M2 is not damaged.

Note that, in a case where a power density of the pulsed laser PL1 input to the second non-linear optical crystal M2 is not more than 20 GW/cm$^2$, white light or a damage would not generally occur in the second non-linear optical crystal M2. Thus, each of the conditions 2b and 2c may be replaced with the following condition 2d.

Condition 2d: The power density of the pulsed laser PL1 input to the second non-linear optical crystal M2 is not more than 20 GW/cm$^2$.

Step S107 is a step of adjusting the rotation angle a2 of the second non-linear optical crystal M2. In one example, step S107 is a step of increasing the rotation angle a2 by a predetermined increment $\delta$, where an initial value a2=0. In this case, carrying out step S107 $m$ times repeatedly sets the rotation angle a2 at $\delta \times m$. Step S108 is a step of determining whether or not the following condition 2e is satisfied. Step S107 is repeatedly carried out until it is determined in step S108 that the following condition 2e is satisfied.

Condition 2e: The energy fluctuation $\sigma 2$ in the pulsed laser PL2y output from the second non-linear optical crystal M2 is minimized.

Step S109 is a step of adjusting the distance d3 from the second non-linear optical crystal M2 to the third non-linear optical crystal M3. In one example, step S109 is a step of increasing the distance d3 by a predetermined increment $\Delta$, where an initial value d3=0. In this case, carrying out step S109 $m$ times repeatedly sets the distance d3 at $\Delta \times m$. Step S110 is a step of determining whether or not the following conditions 3a to 3c are satisfied. Step S109 is repeatedly carried out until it is determined in step S110 that all the conditions 3a to 3c are satisfied.

Condition 3a: The energy conversion efficiency $\eta 3$ in the first non-linear optical crystal M1, the second non-linear optical crystal M2, and the third non-linear optical crystal M3 is maximized.
Condition 3b: The third non-linear optical crystal M3 does not generate white light due to self-phase modulation.
Condition 3c: The third non-linear optical crystal M3 is not damaged.

Note that, in a case where a power density of the pulsed laser PL2 input to the third non-linear optical crystal M3 is not more than 20 GW/cm$^2$, white light or a damage would not generally occur in the third non-linear optical crystal M3. Thus, each of the conditions 3b and 3c may be replaced with the following condition 3d.

Condition 3d: The power density of the pulsed laser PL2 input to the third non-linear optical crystal M3 is not more than 20 GW/cm$^2$.

Step S111 is a step of adjusting the rotation angle a3 of the third non-linear optical crystal M3. In one example, step S111 is a step of increasing the rotation angle a3 by a predetermined increment δ, where an initial value a3=0. In this case, carrying out step S111 m times repeatedly sets the rotation angle a3 at δ×m. Step S112 is a step of determining whether or not the following condition 3e is satisfied. Step S111 is repeatedly carried out until it is determined in step S112 that the following condition 3e is satisfied.

Condition 3e: The energy fluctuation σ3 in the pulsed laser PL3y output from the third non-linear optical crystal M3 is minimized.

Note that the above-described setting method Si may be carried out repeatedly while reducing the above-described increments Δ and δ. For example, after the setting method Si is carried out with the increments set as Δ=1 mm and δ=1°, the setting method Si may be carried out again with the increments set as Δ=0.1 mm and δ=0.1°. With this, it is possible to set the distances d1 to d3 and the rotation angles a1 to a3 with a higher accuracy.

(Examples of Pulse Shaping Device)

An Example of the pulse shaping device 1 will be described with reference to FIGS. 3 to 8. In this Example, used as the laser light source 2 was a titanium-sapphire laser generating a pulsed laser PL having a center wavelength of 810 nm, a pulse width of 40 fs, and a repetition frequency of 100 Hz. With regard to the pulsed laser PL, an average value of energies measured for respective pulses (hereinafter, such an average value will also be referred to as an "average energy") was approximately 80 μJ. An energy fluctuation σ (a standard deviation of energies measured for respective pulses) in the pulsed laser was 2.4% with respect to the average energy.

As a result of carrying out the above-described steps S101 and S102, the distance d1 from the pinhole C to the first non-linear optical crystal M1 was set at 90 mm.

Figure 3:
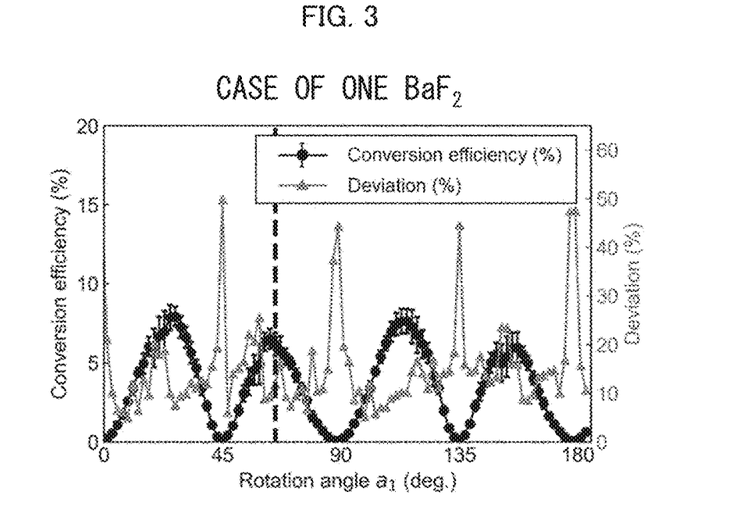
FIG. 3 is a graph illustrating how (i) an energy conversion efficiency in a first non-linear optical crystal and (ii) an energy fluctuation in a pulsed laser output from the first non-linear optical crystal depended on a rotation angle of the first non-linear optical crystal.

After the above-described steps S101 and S102 were carried out, an energy conversion efficiency η1 in the first non-linear optical crystal M1 and an energy fluctuation σ1 in a pulsed laser PL1y output from the first non-linear optical crystal M1 were measured while changing the rotation angle a1 of the first non-linear optical crystal M1. FIG. 3 is a graph illustrating a result of the measurement. Note that FIG. 3 plots, instead of the energy fluctuation σ1 itself, a relative energy fluctuation Σ1, which is a ratio of the energy fluctuation σ1 with respect to an average energy of the pulsed laser PL1y.

As shown in FIG. 3, the energy conversion efficiency η1 sinusoidally depended on the rotation angle a1 with a cycle of 90°, and had a maximum value (approximately 7.5%) when a1=22.5°, 67.5°, 112.5°, and 157.5°. Thus, as a result of carrying out the above-described steps S103 and S104, the rotation angle a1 is set at any of these four angles. In the present Example, a1=67.5°.

Then, as a result of carrying out the above-described steps S105 and S106, the distance d2 from the first non-linear optical crystal M1 to the second non-linear optical crystal M2 was set at 90 mm.

Figure 4:
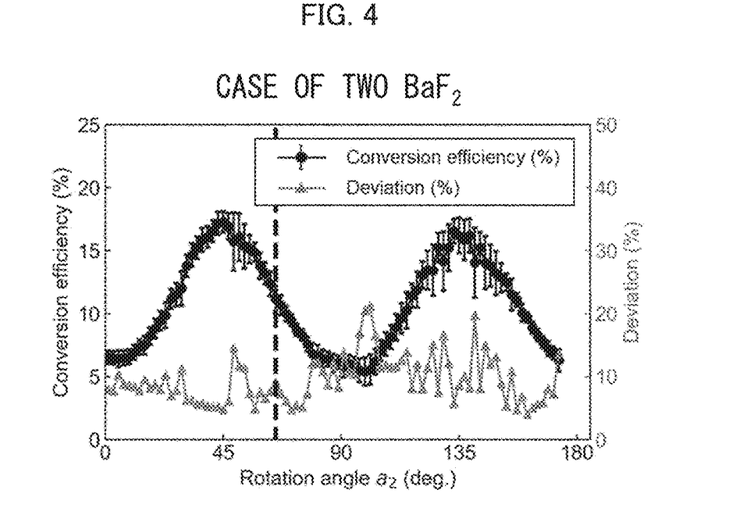
FIG. 4 is a graph illustrating how (i) an energy conversion efficiency in the first non-linear optical crystal and a second non-linear optical crystal and (ii) an energy fluctuation in a pulsed laser output from the second non-linear optical crystal depended on a rotation angle of the second non-linear optical crystal.

After the above-described steps S105 and S106 were carried out, an energy conversion efficiency η2 in the first non-linear optical crystal M1 and the second non-linear optical crystal M2 and an energy fluctuation σ2 in a pulsed laser PL2y output from the second non-linear optical crystal M2 were measured while changing the rotation angle a2 of the second non-linear optical crystal M2. FIG. 4 is a graph illustrating a result of the measurement. Note that FIG. 4 plots, instead of the energy fluctuation σ2 itself, a relative energy fluctuation Σ2, which is a ratio of the energy fluctuation σ2 with respect to an average energy of the pulsed laser PL2y.

As shown in FIG. 4, the energy fluctuation σ2 sinusoidally depended on the rotation angle a2 with a cycle of 180°, and had a minimum value when a2=67.5° and 157.5°. Thus, as a result of carrying out the above-described steps S107 and S108, the rotation angle a2 is set at either of these two angles. In the present Example, a2=67.5°. At this point, the energy conversion efficiency η2 was approximately 11%, and the relative energy fluctuation Σ2 was approximately 9%.

Then, as a result of carrying out the above-described steps S109 and S110, the distance d3 from the second non-linear optical crystal M2 to the third non-linear optical crystal M3 was set at 110 mm.

Figure 5:
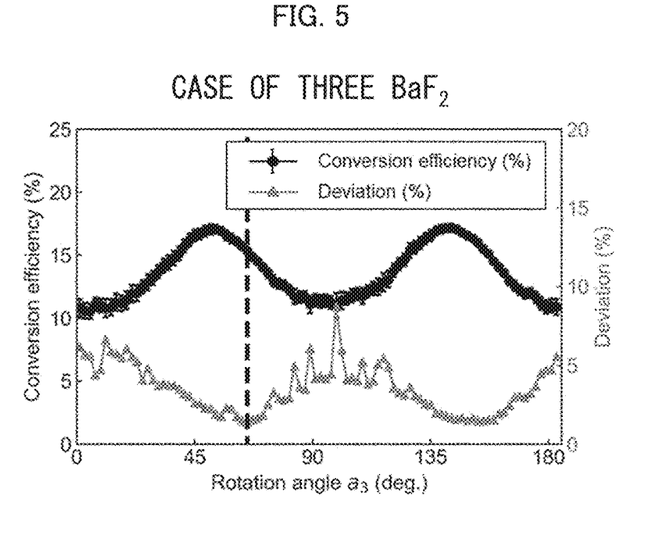
FIG. 5 is a graph illustrating how (i) an energy conversion efficiency in the first non-linear optical crystal, the second non-linear optical crystal, and a third non-linear optical crystal and (ii) an energy fluctuation in a pulsed laser output from the third non-linear optical crystal depended on a rotation angle of the third non-linear optical crystal.

After the above-described steps S109 and S110 were carried out, an energy conversion efficiency η3 in the first non-linear optical crystal M1, the second non-linear optical crystal M2, and the third non-linear optical crystal M3 and an energy fluctuation σ3 in a pulsed laser PL3y output from the third non-linear optical crystal M3 were measured while changing the rotation angle a3 of the third non-linear optical crystal M3. FIG. 5 is a graph illustrating a result of the measurement. Note that FIG. 5 plots, instead of the energy fluctuation σ3 itself, a relative energy fluctuation Σ3, which is a ratio of the energy fluctuation σ3 with respect to an average energy of the pulsed laser PL3y.

As shown in FIG. 5, the energy fluctuation σ3 sinusoidally depended on the rotation angle a3 with a cycle of 180°, and had a minimum value when a3=67.5° and 157.5°. Thus, as a result of carrying out the above-described steps S111 and S112, the rotation angle a3 is set at either of these two angles. In this example, a3=67.5°. At this point, the energy conversion efficiency η3 was approximately 16%, and the relative energy fluctuation Σ3 was approximately 1.4%.

From FIG. 3, it is found that, with a conventional pulse shaping device including one non-linear optical crystal M1, the relative energy fluctuation Σ1 in the obtained pulsed laser PL1y could not be not more than the relative energy fluctuation Σ in the pulsed laser P1 output from the laser light source 2. Similarly, from FIG. 4, it is found that, with a conventional pulse shaping device including two one non-linear optical crystals M1 and M2, the relative energy fluctuation Σ2 in the obtained pulsed laser PL2y could not be not more than the relative energy fluctuation Σ in the pulsed laser P1 output from the laser light source 2. Meanwhile, from FIG. 5, it is found that, with a pulse shaping device 1 including three non-linear optical crystals M1 to M3, the relative energy fluctuation Σ3 in the obtained pulsed laser PL3y could be equal to the relative energy fluctuation Σ in the pulsed laser P1 output from the laser light source 2. From these, it was demonstrated that the pulse shaping device 1 including the three non-linear optical crystals M1 to M3 could yield the pulsed laser PL3y having a relative energy fluctuation smaller than those of the conventional pulse shaping devices. It was also demonstrated that the pulse shaping device 1 including the three non-linear optical crystals M1 to M3 could yield the pulsed laser PL3y having a relative energy fluctuation as small as that of the pulsed laser PL of the laser light source 2.

Figure 6:
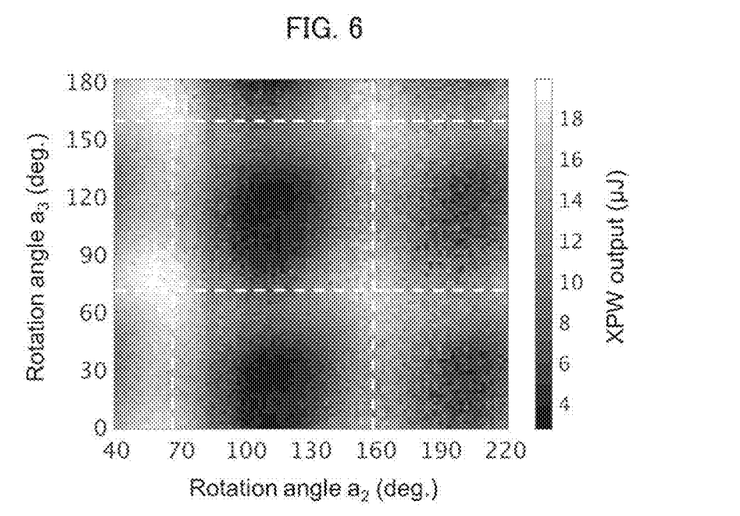
FIG. 6 is a graph illustrating how an energy of a pulsed laser output from a non-linear optical crystal group including three non-linear optical crystals depended on a rotation angle, observed when a rotation angle a1 of a first non-linear optical crystal M1 was fixed at 22.5° and a rotation angle a2 of a second non-linear optical crystal M2 and a rotation angle a3 of a third non-linear optical crystal M3 were independently changed.

Referring to FIG. 6, in a case where the rotation angle a1 of the first non-linear optical crystal M1 was fixed at 22.5° and the rotation angle a2 of the second non-linear optical crystal M2 and the rotation angle a3 of the third non-linear optical crystal M3 were independently changed, the non-linear optical crystal group output a pulsed laser having an energy that sinusoidally depended on the rotation angles a2 and a3 with a cycle of 180° and that had a maximum value when (a2, a3)=around (67.5°, 67.5°) or around (67.5°, 157.5°) or around (157.5°, 67.5°) or around (157.5°, 157.5°).

Figure 7:
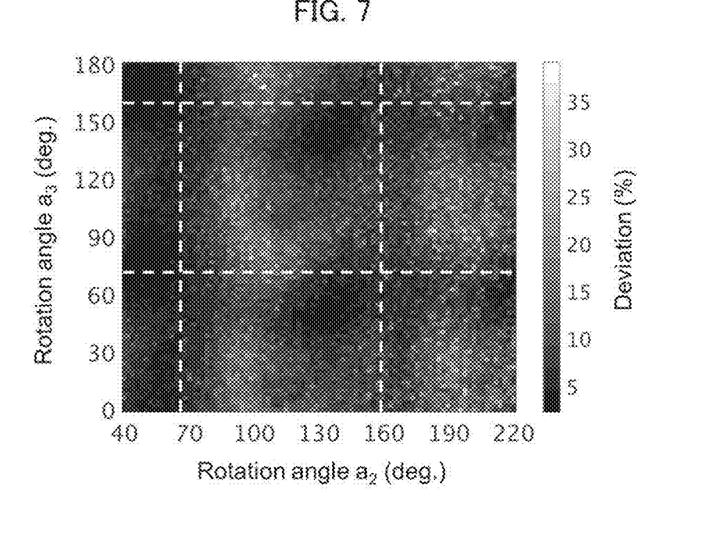
FIG. 7 is a graph illustrating how an energy fluctuation in a pulsed laser output from a non-linear optical crystal group including three non-linear optical crystals depended on a rotation angle, observed when a rotation angle a1 of a first non-linear optical crystal M1 was fixed at 22.5° and a rotation angle a2 of a second non-linear optical crystal M2 and a rotation angle a3 of a third non-linear optical crystal M3 were independently changed.

Referring to FIG. 7, in a case where the rotation angle a1 of the first non-linear optical crystal M1 was fixed at 22.5° and the rotation angle a2 of the second non-linear optical crystal M2 and the rotation angle a3 of the third non-linear optical crystal M3 were independently changed, the non-linear optical crystal group output a pulsed laser having an energy fluctuation σ3 that sinusoidally depended on the rotation angles a2 and a3 with a cycle of 180° and that had a minimum value when (a2, a3)=around (67.5°, 67.5°) or around (67.5°, 157.5°) or around (157.5°, 67.5°) or around (157.5°, 157.5°). Note that FIG. 7 plots, instead of the energy fluctuation σ3 itself, a relative energy fluctuation Σ3 that is a ratio of the energy fluctuation σ3 with respect to an average energy of the pulsed laser PL3y. In this example, (a2, a3)=(54°, 162°). At this point, the relative energy fluctuation Σ3 was approximately 2.3%.

Figure 8:
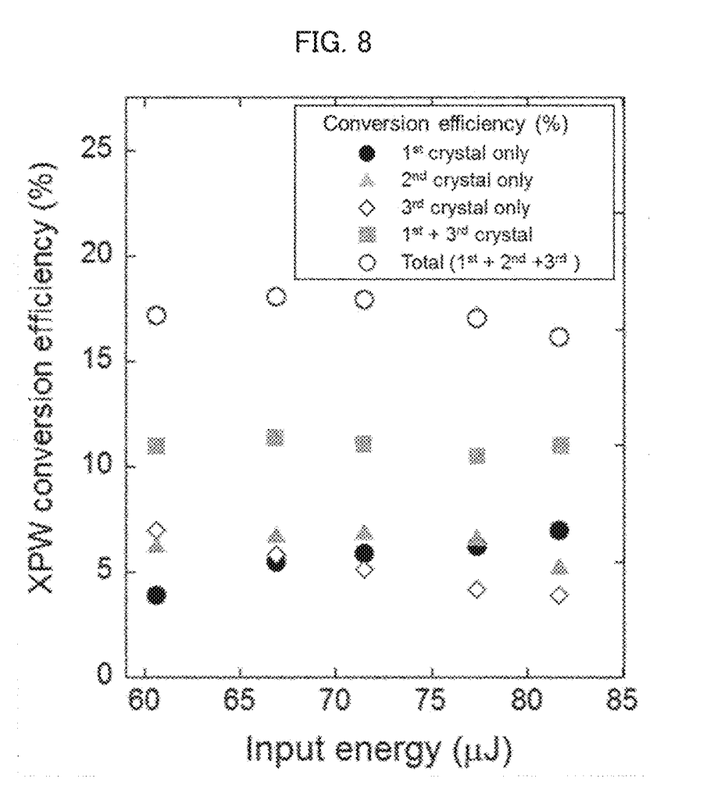
FIG. 8 is a graph illustrating how (i) an energy conversion efficiency in a non-linear optical crystal group including one non-linear optical crystal, (ii) an energy conversion efficiency in a non-linear optical crystal group including two non-linear optical crystals, and (iii) an energy conversion efficiency in a non-linear optical crystal group including three non-linear optical crystals depended on an input energy.

FIG. 8 is a graph illustrating how the following energy conversion efficiencies depended on an input energy.

(1) An energy conversion efficiency, in a non-linear optical crystal group including a first non-linear optical crystal M1, at which x-polarized wave is converted into y-polarized wave.
(2) An energy conversion efficiency, in a non-linear optical crystal group including a second non-linear optical crystal M2, at which x-polarized wave is converted into y-polarized wave.
(3) An energy conversion efficiency, in a non-linear optical crystal group including a third non-linear optical crystal M3, at which x-polarized wave is converted into y-polarized wave.
(4) An energy conversion efficiency, in a non-linear optical crystal group including two non-linear optical crystals M1 and M3, at which x-polarized wave is converted into y-polarized wave.
(5) An energy conversion efficiency, in a non-linear optical crystal group including three non-linear optical crystals M1 to M3, at which x-polarized wave is converted into y-polarized wave.

FIG. 8 shows that the energy conversion efficiency in the non-linear optical crystal group including the one non-linear optical crystal was approximately 5%. FIG. 8 shows that the energy conversion efficiency in the non-linear optical crystal group including the two non-linear optical crystals was approximately 10%. FIG. 8 shows that the energy conversion efficiency in the non-linear optical crystal group including the three non-linear optical crystals was approximately 15%. That is, FIG. 8 reveals that, each time the number of non-linear optical crystals included in the non-linear optical crystal group was increased by one, an energy conversion efficiency in the non-linear optical crystal group was increased by approximately 5%. FIG. 8 also indicates that this tendency was maintained even if the input energy was changed by ±20%. This reveals that the pulse shaping device 1 including the three non-linear optical crystals M1 to M3 is so durable that the pulse shaping device 1 can continuously output, with a high energy conversion efficiency, a pulsed laser having a high contrast and a small energy fluctuation even when a variation occurs in the input energy due to long-term use.

(Variations of Non-Linear Optical Crystal)

Note that each of the non-linear optical crystals M1 to Mn constituting the non-linear optical crystal group M is not limited to a $BaF_2$ crystal, and may be any non-linear optical crystal. Particularly, any of the non-linear optical crystals listed in Table 1 below can be suitably used as each of the non-linear optical crystals M1 to Mn constituting the non-linear optical crystal group M, since these non-linear optical crystals have a high anisotropy ($x^3$) and exhibit high transmittance and a low group velocity at a wavelength of a pulsed laser PL output from the laser light source 2.

TABLE 1

| Name of substance | Compositional formula | Crystallographic point group |
|---|---|---|
| Barium fluoride | $BaF_2$ | $Fm\bar{3}m$ |
| Calcium fluoride | $CaF_2$ | $Fm\bar{3}m$ |
| Lithium fluoride | $LiF$ | $Fm\bar{3}m$ |
| Sodium chloride | $NaCl$ | $Fm\bar{3}m$ |
| Sodium iodide | $NaI$ | $Fm\bar{3}m$ |
| Potassium iodide | $KI$ | $Fm\bar{3}m$ |
| Zinc selenide | $ZnSe$ | $F\bar{4}3m$ |
| Zinc telluride | $ZnTe$ | $Fd\bar{3}m$ |
| Carbon | C (diamond) | $Fd\bar{3}m$ |
| Germanium | $Ge$ | $Fd\bar{3}m$ |
| Silicon | $Si$ | $Fd\bar{3}m$ |
| Dialuminium magnesium tetraoxide | $Al_2MgO_4$ | $Fd\bar{3}m$ |
| Lead fluoride | $PbF_2$ | $Fm\bar{3}m$ |
| Strontium fluoride | $SrF_2$ | $Fm\bar{3}m$ |
| Sodium fluoride | $NaF$ | $Fm\bar{3}m$ |
| Silver(I) chloride | $AgCl$ | $Fm\bar{3}m$ |
| Rubidium chloride | $RbCl$ | $Fm\bar{3}m$ |
| Rubidium bromide | $RbBr$ | $Fm\bar{3}m$ |
| Yttrium•vanadium tetraoxide | $YVO_4$ | |
| Beta barium borate | $\beta\text{-}BaB_2O_4$ (BBO) | — |

(Variations of Pulse Shaping Device)

Figure 9:
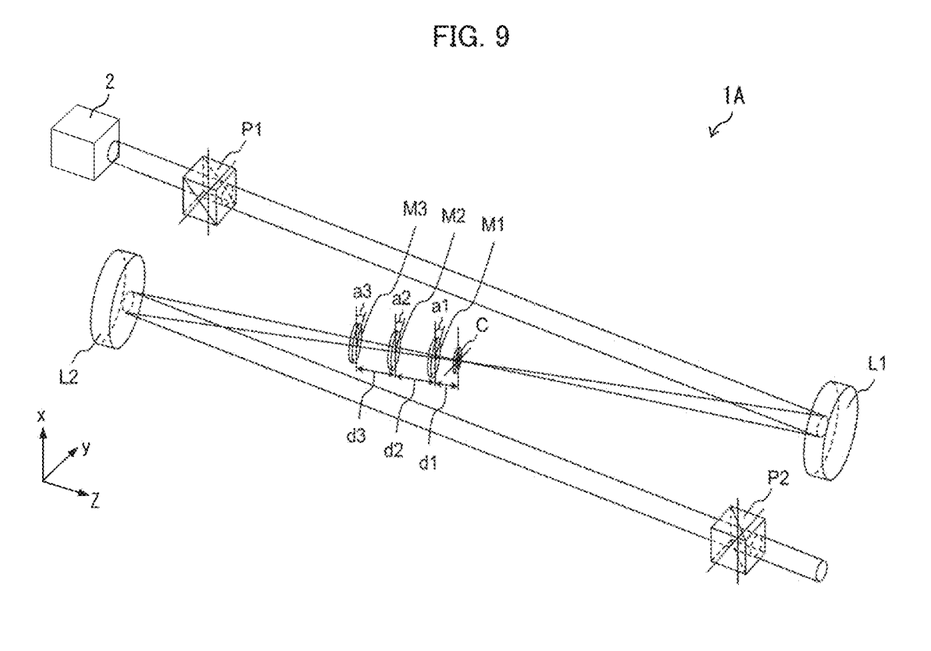
FIG. 9 is a perspective view illustrating a variation of the pulse shaping device shown in FIG. 1.

The following description will discuss, with reference to FIG. 9, a variation of the pulse shaping device 1. FIG. 9 is a perspective view illustrating a configuration of a pulse shaping device 1A in accordance with the present variation.

The pulse shaping device 1A in accordance with the present variation corresponds to the pulse shaping device 1 shown in FIG. 1 modified as below. Specifically, each of the first lens L1 and the second lens L2 in the pulse shaping device 1 is a plano-convex lens, whereas each of a first lens L1 and a second lens L2 in the pulse shaping device 1A is a concave mirror. Thus, the optical path of the pulsed laser in the pulse shaping device 1 has an I-shape, whereas an optical path of a pulsed laser in the pulse shaping device 1A has a Z-shape that is curved at the first lens L1 and at the second lens L2.

The pulse shaping device 1A in accordance with the present variation can provide an effect similar to that given by the pulse shaping device 1 shown in FIG. 1. In addition, the pulse shaping device 1A in accordance with the present variation is advantageous in that the size of the pulse shaping device 1A can be more easily reduced than the pulse shaping device 1 shown in FIG. 1.

(Application of Pulse Shaping Device)

A high-intensity, ultrashort pulsed laser is used in various industrial fields. For example, an application of a high-intensity, ultrashort pulsed laser to laser processing makes it possible to carry out processing with a suppressed thermal effect. This is possible because an irradiation period of such a pulsed laser is short and therefore heat caused by atomic vibrations is hardly transmitted to an area around an irradiated part. The laser processing involving use of a high-intensity, ultrashort pulsed laser takes advantage of this property and is applied in the fields of precision processing such as those for aircrafts and automobile parts. For other examples, the high-intensity, ultrashort pulsed laser is also used to fabricate a fine structure on a surface of a material for achieving structural coloring or for surface modification such as improvement in wettability and/or friction reduction. As described above, the high-intensity, ultrashort pulsed laser is applicable to a wide variety of fields. An application of the pulse shaping device 1 to a high-intensity, ultrashort pulsed laser such as a commercial titanium-sapphire laser enables stable supply of a high-quality pulse.

The pulse shaping device 1 is also expected to be applied to next-generation technologies. When a back side of a target is irradiated with a high-intensity, ultrashort pulsed laser, a high-intensity electric field of a TV/m-order is generated thereon. As a result of employing a laser method involving such a large electric field gradient, it is possible to drastically reduce the size of a conventional high-frequency accelerator. The field in which size reduction of the accelerator is expected is may be, for example, a heavy-particle cancer radiotherapy device (quantum scalpel). If the size of the heavy ion cancer therapy device can be reduced, therapy facilities that are currently concentrated in big cities would be spread over various places in a country. Consequently, more patients can receive a more advanced therapy.

A mechanism for accelerating ions with a high-intensity, ultrashort pulsed laser is called Target Normal Sheath Acceleration (TNSA). TNSA is a technique for irradiating a target with a high-intensity, ultrashort pulsed laser to generate a high-intensity electric field on a back side of the target, thereby drawing and accelerating ions on the back side of the target. In order to efficiently accelerate ions, it is necessary to generate a strong electric field gradient on the back side of the target. In a case where a pulsed laser with a low contrast ratio is used, an electric field gradient formed on the back side of the target when a main pulse reaches the target is impaired. Use of the pulse shaping device 1 can improve the contrast ratio of the pulsed laser to be emitted to the target, thereby making it possible to enhance the efficiency of TNSA. In addition, use of the pulse shaping device 1 can reduce an energy fluctuation in the pulsed laser to be emitted to the target. This leads to stabilization of the energy and the number of particles of accelerated ions, and thus is an important point in seeking stable use of medical accelerators.

Additional Remarks 1

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention.

Additional Remarks 2

The present specification also discloses the following aspects.

Aspect 1

A pulse shaping device includes: a non-linear optical crystal group including at least two non-linear optical crystals arranged side by side on an optical path of an input pulsed laser, wherein, among the at least two non-linear optical crystals, an i-th one from an upstream side of the input pulsed laser is an i-th non-linear optical crystal, and an angle a2 made by a crystallographic axis of a second non-linear optical crystal and a polarization direction of the input pulsed laser is set so that a relative energy fluctuation in a pulsed laser being output from the second non-linear optical crystal and having a polarization direction orthogonal to the polarization direction of the input pulsed laser is smaller than a relative energy fluctuation in a pulsed laser being output from a first non-linear optical crystal and having a polarization direction orthogonal to the polarization direction of the input pulsed laser.

With the aspect 1, it is possible to improve a contrast ratio of the pulsed laser with use of the non-linear optical crystal group. In addition, with the above configuration, a relative energy fluctuation in a pulsed laser output from the non-linear optical crystal group can be reduced as compared with that in a conventional pulse shaping device (in which an angle a2 is set so as to maximize an energy conversion efficiency in a second non-linear optical crystal at which (a) a pulsed laser having a polarization direction being in parallel with a polarization direction of an input pulsed laser is converted into (b) a pulsed laser having a polarization direction being orthogonal to the polarization direction of the input pulsed laser).

Aspect 2

The pulse shaping device described in the aspect 1, wherein the angle a2 is set so as to minimize the relative energy fluctuation in the pulsed laser being output from the second non-linear optical crystal and having the polarization direction orthogonal to the polarization direction of the input pulsed laser.

With the aspect 2, it is possible to further reduce the relative energy fluctuation in the pulsed laser output from the non-linear optical crystal group.

Aspect 3

A pulse shaping method includes: using a non-linear optical crystal group to improve a contrast ratio of an input pulsed laser, the non-linear optical crystal group including at least two non-linear optical crystals arranged side by side on an optical path of the input pulsed laser; and, while assuming that, among the at least two non-linear optical crystals, an i-th one from an upstream side of the input pulsed laser is an i-th non-linear optical crystal, setting an angle a2 made by a crystallographic axis of a second non-linear optical crystal and a polarization direction of the input pulsed laser so that a relative energy fluctuation in a pulsed laser being output from the second non-linear optical crystal and having a polarization direction orthogonal to the polarization direction of the input pulsed laser is smaller than a relative energy fluctuation in a pulsed laser being output from a first non-linear optical crystal and having a polarization direction orthogonal to the polarization direction of the input pulsed laser.

With the aspect 3, it is possible to improve the contrast ratio of the pulsed laser with use of the non-linear optical crystal group. In addition, with the aspect 3, a relative energy fluctuation in a pulsed laser output from the non-linear optical crystal group can be reduced as compared with that in a conventional pulse shaping method (in which an angle a2 is set so as to maximize an energy conversion efficiency in a second non-linear optical crystal at which (a) a pulsed laser having a polarization direction being in parallel with a polarization direction of an input pulsed laser is converted into (b) a pulsed laser having a polarization direction being orthogonal to the polarization direction of the input pulsed laser).

Aspect 4

The pulse shaping method described in the aspect 3, wherein, in the setting of the angle a2, the angle a2 is set so as to minimize the relative energy fluctuation in the pulsed laser being output from the second non-linear optical crystal and having the polarization direction orthogonal to the polarization direction of the input pulsed laser.

With the aspect 4, it is possible to further reduce the relative energy fluctuation in the pulsed laser output from the non-linear optical crystal group.

Additional Remarks 3

A pulse shaping device in accordance with a first aspect of the present invention includes: a non-linear optical crystal group including at least three non-linear optical crystals arranged side by side on an optical path of an input pulsed laser.

With the above configuration, it is possible to improve a contrast ratio of the pulsed laser with use of the non-linear optical crystal group. In addition, with the above configuration, in which the non-linear optical crystal group includes the at least three non-linear optical crystals, a relative energy fluctuation in an obtained pulsed laser can be reduced as compared with that in a conventional pulse shaping device including a non-linear optical crystal group including two or less non-linear optical crystals.

Note that a relative energy fluctuation in a certain pulsed laser refers to a ratio of an energy fluctuation in the certain pulsed laser with respect to an average energy of the certain pulsed laser. Here, an energy fluctuation in a certain pulsed laser refers to a variation in energies measured for respective pulses with regard to the certain pulsed laser. An average energy of a certain pulsed laser refers to an average value of energies measured for respective pulses with regard to the certain pulsed laser.

A pulse shaping device in accordance with a second aspect of the present invention has, in addition to the feature(s) of the pulse shaping device in accordance with the first aspect, a feature wherein a pulsed laser being output from the non-linear optical crystal group and having a polarization direction orthogonal to a polarization direction of the input pulsed laser has a relative energy fluctuation that is not more than 5 times a relative energy fluctuation in the input pulsed laser.

With the above configuration, it is possible to suppress a relative energy fluctuation in an obtained pulsed laser so as to be not more than 5 times the energy fluctuation in the input pulsed laser.

A pulse shaping device in accordance with a third aspect of the present invention has, in addition to the feature(s) of the pulse shaping device in accordance with the first or second aspect, a feature wherein, among the at least three non-linear optical crystals, an i-th one from an upstream side of the input pulsed laser is an i-th non-linear optical crystal, and an angle a3 made by a crystallographic axis of a third non-linear optical crystal and a polarization direction of the input pulsed laser is set so that a relative energy fluctuation in a pulsed laser being output from the third non-linear optical crystal and having a polarization direction orthogonal to the polarization direction of the input pulsed laser is smaller than a relative energy fluctuation in a pulsed laser being output from a second non-linear optical crystal and having a polarization direction orthogonal to the polarization direction of the input pulsed laser.

With the above configuration, a relative energy fluctuation in an obtained pulsed laser can be reduced as compared with that of the conventional pulse shaping device.

A pulse shaping device in accordance with a fourth aspect of the present invention has, in addition to the feature(s) of the pulse shaping device in accordance with the third aspect, a feature wherein the angle a3 is set so as to minimize the relative energy fluctuation in the pulsed laser being output from the third non-linear optical crystal and having the polarization direction orthogonal to the polarization direction of the input pulsed laser.

With the above configuration, it is possible to further reduce the relative energy fluctuation in the obtained pulsed laser.

A pulse shaping device in accordance with a fifth aspect of the present invention has, in addition to the feature(s) of the pulse shaping device in accordance with any one of the first to fourth aspects, a feature wherein, among the at least three non-linear optical crystals, an i-th one from an upstream side of the input pulsed laser is an i-th non-linear optical crystal, and an angle a2 made by a crystallographic axis of a second non-linear optical crystal and a polarization direction of the input pulsed laser is set so that a relative energy fluctuation in a pulsed laser being output from the second non-linear optical crystal and having a polarization direction orthogonal to the polarization direction of the input pulsed laser is smaller than a relative energy fluctuation in a pulsed laser being output from a first non-linear optical crystal and having a polarization direction orthogonal to the polarization direction of the input pulsed laser.

With the above configuration, a relative energy fluctuation in an obtained pulsed laser can be reduced as compared with that of the conventional pulse shaping device.

A pulse shaping device in accordance with a sixth aspect of the present invention has, in addition to the feature(s) of the pulse shaping device in accordance with the fifth aspect, a feature wherein the angle a2 is set so as to minimize the relative energy fluctuation in the pulsed laser being output from the second non-linear optical crystal and having the polarization direction orthogonal to the polarization direction of the input pulsed laser.

With the above configuration, it is possible to further reduce the relative energy fluctuation in the obtained pulsed laser.

A pulse shaping device in accordance with a seventh aspect of the present invention has, in addition to the feature(s) of the pulse shaping device in accordance with any one of the first to sixth aspects, a feature wherein, among the at least three non-linear optical crystals, an i-th one from an upstream side of the input pulsed laser is an i-th non-linear optical crystal, and an angle a1 made by a crystallographic axis of a first non-linear optical crystal and a polarization direction of the linearly polarized light is set so as to maximize an energy conversion efficiency in the first non-linear optical crystal at which the input pulsed laser is converted into a pulsed laser having a polarization direction orthogonal to a polarization direction of the input pulsed laser.

With the above configuration, an energy conversion efficiency in the non-linear optical crystal group at which the input pulsed laser is converted into the pulsed laser having the polarization direction orthogonal to the polarization direction of the input pulsed laser can be kept substantially equal to that in the conventional pulse shaping device.

A pulse shaping device in accordance with an eighth aspect of the present invention has, in addition to the feature(s) of the pulse shaping device in accordance with any one of the first to seventh aspects, a feature wherein the pulse shaping device further includes: a first polarizer arranged on an optical path of a pulsed laser generated by a laser light source; a first lens arranged on an optical path of the pulsed laser having transmitted through the first polarizer; a pinhole arranged on an optical path of the first lens; a second lens arranged on an optical path of the pulsed laser having passed through the pinhole; and a second polarizer arranged on an optical path of the pulsed laser having transmitted through the second lens, wherein the non-linear optical crystal group is arranged between the pinhole and the second lens, and the first polarizer allows the input pulsed laser input to the non-linear optical crystal group to transmit through the first polarizer, and the second polarizer allows the pulsed laser being output from the non-linear optical crystal group and having the polarization direction orthogonal to the polarization direction of the input pulsed laser to transmit through the second polarizer.

With the above configuration, it is possible to improve, with a simple configuration, the contrast ratio of the pulsed laser.

A pulse shaping method in accordance with a ninth aspect of the present invention includes: using a non-linear optical crystal group to improve a contrast ratio of an input pulsed laser, the non-linear optical crystal group including at least three non-linear optical crystals arranged side by side on an optical path of the input pulsed laser.

With the above configuration, it is possible to improve the contrast ratio of the pulsed laser with use of the non-linear optical crystal group. In addition, with the above configuration, in which the non-linear optical crystal group includes the at least three non-linear optical crystals, a relative energy fluctuation in an obtained pulsed laser can be reduced as compared with that in a conventional pulse shaping method in which a non-linear optical crystal group includes two or less non-linear optical crystals.

REFERENCE SIGNS LIST

1: Pulse shaping device
P1: First polarizer
L1: First lens
C: Pinhole
M: Non-linear optical crystal group
M1 to Mn: Non-linear optical crystal
L2: Second lens
P2: Second polarizer
1A: Pulse shaping device (variation)
2: Laser light source

The invention claimed is:

1. A pulse shaping device comprising:
a non-linear optical crystal group including at least three non-linear optical crystals arranged side by side on an optical path of an input pulsed laser, wherein
among said at least three non-linear optical crystals, an i-th one from an upstream side of the input pulsed laser is an i-th non-linear optical crystal,
no polarizer is provided between a second non-linear optical crystal and a third non-linear optical crystal, and
an angle a3 made by a crystallographic axis of the third non-linear optical crystal and a polarization direction of the input pulsed laser is set so that a relative energy fluctuation in a pulsed laser being output from the third non-linear optical crystal and having a polarization direction orthogonal to the polarization direction of the input pulsed laser is smaller than a relative energy fluctuation in a pulsed laser being output from the second non-linear optical crystal and having a polarization direction orthogonal to the polarization direction of the input pulsed laser.

2. The pulse shaping device as set forth in claim 1, wherein
a pulsed laser being output from the non-linear optical crystal group and having a polarization direction orthogonal to a polarization direction of the input pulsed laser has a relative energy fluctuation that is not more than 5 times a relative energy fluctuation in the input pulsed laser.

3. The pulse shaping device as set forth in claim 1, wherein
the angle a3 is set so as to minimize the relative energy fluctuation in the pulsed laser being output from the third non-linear optical crystal and having the polarization direction orthogonal to the polarization direction of the input pulsed laser.

4. The pulse shaping device as set forth in claim 1, wherein
an angle a2 made by a crystallographic axis of the second non-linear optical crystal and the polarization direction of the input pulsed laser is set so that the relative energy fluctuation in the pulsed laser being output from the second non-linear optical crystal and having the polarization direction orthogonal to the polarization direction of the input pulsed laser is smaller than a relative energy fluctuation in a pulsed laser being output from the first non-linear optical crystal and having a polarization direction orthogonal to the polarization direction of the input pulsed laser.

5. The pulse shaping device as set forth in claim 4, wherein
the angle a2 is set so as to minimize the relative energy fluctuation in the pulsed laser being output from the second non-linear optical crystal and having the polarization direction orthogonal to the polarization direction of the input pulsed laser.

6. The pulse shaping device as set forth in claim 1, wherein
an angle a1 made by a crystallographic axis of the first non-linear optical crystal and the polarization direction of the input pulsed laser is set so as to maximize an energy conversion efficiency in the first non-linear optical crystal at which the input pulsed laser is converted into a pulsed laser having a polarization direction orthogonal to the polarization direction of the input pulsed laser.

7. The pulse shaping device as set forth in claim 1, further comprising:
a first polarizer arranged on an optical path of a pulsed laser generated by a laser light source;
a first lens arranged on an optical path of the pulsed laser having transmitted through the first polarizer;
a pinhole arranged on an optical path of the pulsed laser having transmitted through the first lens;
a second lens arranged on an optical path of the pulsed laser having passed through the pinhole; and
a second polarizer arranged on an optical path of the pulsed laser having transmitted through the second lens, wherein the non-linear optical crystal group is arranged between the pinhole and the second lens, and the first polarizer allows the input pulsed laser input to the non-linear optical crystal group to transmit through the first polarizer, and the second polarizer allows the pulsed laser being output from the non-linear optical crystal group and having the polarization direction orthogonal to the polarization direction of the input pulsed laser to transmit through the second polarizer.

8. A pulse shaping method comprising:

using a non-linear optical crystal group to improve a contrast ratio of an input pulsed laser, the non-linear optical crystal group including at least three non-linear optical crystals arranged side by side on an optical path of the input pulsed laser, wherein among said at least three non-linear optical crystals, an i-th one from an upstream side of the input pulsed laser is an i-th non-linear optical crystal, no polarizer is provided between a second non-linear optical crystal and a third non-linear optical crystal, and an angle a3 made by a crystallographic axis of the third non-linear optical crystal and a polarization direction of the input pulsed laser is set so that a relative energy fluctuation in a pulsed laser being output from the third non-linear optical crystal and having a polarization direction orthogonal to the polarization direction of the input pulsed laser is smaller than a relative energy fluctuation in a pulsed laser being output from the second non-linear optical crystal and having a polarization direction orthogonal to the polarization direction of the input pulsed laser.

9. The pulse shaping device as set forth in claim 1, wherein the first non-linear optical crystal converts a part of polarized light of the input pulsed laser entering the first non-linear optical crystal into light having a polarization direction orthogonal to the polarization direction of the input pulsed laser, the second non-linear optical crystal converts a part of polarized light of the input pulsed laser entering the second non-linear optical crystal after having passed through the first non-linear optical crystal into light having the polarization direction orthogonal to the polarization direction of the input pulsed laser, and the third non-linear optical crystal converts a part of polarized light of the input pulsed laser entering the third non-linear optical crystal after having passed through the first and second non-linear optical crystals into light having the polarization direction orthogonal to the polarization direction of the input pulsed laser.

10. The pulse shaping method as set forth in claim 8, wherein the first non-linear optical crystal converts a part of polarized light of the input pulsed laser entering the first non-linear optical crystal into light having a polarization direction orthogonal to the polarization direction of the input pulsed laser, the second non-linear optical crystal converts a part of polarized light of the input pulsed laser entering the second non-linear optical crystal after having passed through the first non-linear optical crystal into light having the polarization direction orthogonal to the polarization direction of the input pulsed laser, and the third non-linear optical crystal converts a part of polarized light of the input pulsed laser entering the third non-linear optical crystal after having passed through the first and second non-linear optical crystals into light having the polarization direction orthogonal to the polarization direction of the input pulsed laser.

* * * * *